United States Patent [19]

Anderson

[11] Patent Number: 4,500,273
[45] Date of Patent: Feb. 19, 1985

[54] AUTOMATIC POURING AND DISPENSING MACHINE FOR MANUFACTURING HARD AND SOFT CANDY

[76] Inventor: Dennis M. Anderson, Star Route Box 1049J, Ox Bow Estates, Payson, Ariz. 85541

[21] Appl. No.: 562,870

[22] Filed: Dec. 19, 1983

[51] Int. Cl.³ .................. B29C 5/00; A23G 3/18
[52] U.S. Cl. .................. 425/143; 141/258; 222/235; 222/276; 222/388; 425/257; 425/449
[58] Field of Search .............. 222/234, 235, 263, 275, 222/276, 388, 387; 425/145, 583, 586, 588, 585, 256, 257, 143, 161, 447, 449; 141/258

[56] References Cited

U.S. PATENT DOCUMENTS

| | | | |
|---|---|---|---|
| Re. 30,225 | 3/1980 | Simmons et al. | 425/256 |
| 2,336,355 | 12/1943 | Hallead et al. | 222/287 |
| 2,497,510 | 2/1950 | Miller | 425/145 |
| 2,597,175 | 5/1952 | Perkins | 425/449 |
| 2,834,051 | 5/1958 | Rekettye | 222/275 |
| 2,965,141 | 12/1960 | Hoyer | 141/258 |
| 3,193,156 | 7/1965 | Egee et al. | 222/263 |
| 3,332,582 | 7/1967 | Lewis | 222/276 |
| 3,528,589 | 9/1970 | De Moya et al. | 222/275 |
| 3,693,674 | 9/1972 | Marcel et al. | 222/275 |

*Primary Examiner*—Willard E. Hoag
*Attorney, Agent, or Firm*—Warren F. B. Lindsley

[57] ABSTRACT

An apparatus for measuring and dispensing sugar syrups from a hopper into a mold and employing a mounting block which defines at least one cavity for housing a dispensing valve.

The valve comprises a movable cylinder operable by a first pneumatic means and a piston means operable by a second pneumatic means. A pair of sequencing valves are employed for actuating the first and second pneumatic means in a timed sequence for effecting the movement of the cylinder and piston of the dispensing valve.

11 Claims, 8 Drawing Figures

AUTOMATIC POURING AND DISPENSING MACHINE FOR MANUFACTURING HARD AND SOFT CANDY

BACKGROUND OF THE INVENTION

This invention relates to candy making machines and more particularly to an automatic machine for pouring and dispensing sugar syrups enriched and varied with coloring, flavorings and fillings into molds for manufacturing by crystallization of hard and soft candies.

DESCRIPTION OF THE PRIOR ART

Heretofore the manufacture of soft and hard candies and particularly suckers has been done largely by hand requiring excessive time and expense especially in today's competitive marketplace. In order for the relatively small candy manufacturer and merchandiser to compete on price and quality with the large manufacturer, equipment is needed that can be afforded which will automate the operations normally done by hand.

SUMMARY OF THE INVENTION

In accordance with the invention claimed, a new and improved automatic pouring and dispensing machine is provided which is operable by a single individual yet will greatly extend his hand operation abilities without mechanizing the candy manufacturing operation.

Accordingly, it is one object of this invention to provide a new and improved pouring and dispensing machine for sugar syrups.

Another object of this invention is to provide a new and improved automatic pouring and dispensing machine for sugar syrups which may be easily adjusted for varying the quantity of the syrup dispensed.

A further object of this invention is to provide a new and improved automatic pouring and dispensing machine for manufacturing hard and soft candies which may be easily hand moved from one gang mold to another by an operator.

A still further object of this invention is to provide a simple and efficient automatic pouring and dispensing machine for sugar syrups which is economical to manufacture from readily available parts.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
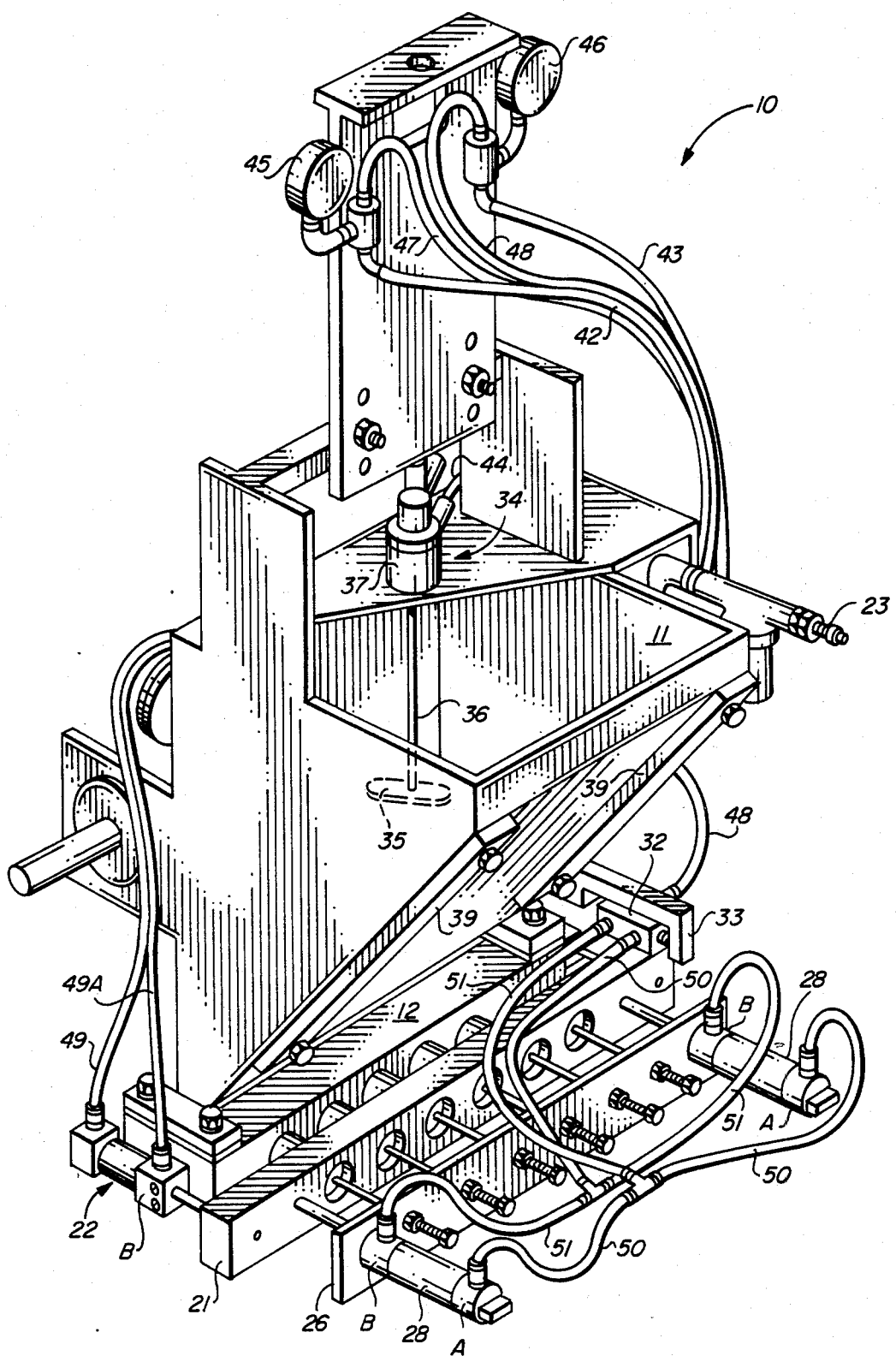
FIG. 1 is a perspective view of an automatic pouring and dispensing machine for sugar syrups and embodying the invention.

Referring more particularly to the drawings by characters of reference, FIG. 1 discloses an automatic pouring and dispensing apparatus or machine 10 for manufacturing hard and soft candies, lollipops and the like formed from sugar syrups which may be enriched and varied with coloring, flavorings and fillings. These candies are manufactured into hard and soft articles in a mold by a method of crystallization well known in the art with the lumps of candy whether stick mounted or not dissolved in the mouth of the consumer.

In order to dispense a metered amount of sugar syrup into a mold having a plurality of cavities, the automatic pouring and dispensing machine 10 was conceived. This machine comprises a hopper 11 vertically mounted on a mounting frame or block 12. The block has a plurality of cavities 13 formed therein, the cavities of which house a dispensing valve mechanism 14 which is in communication with an outlet 15 of hopper 11.

Figure 4A:
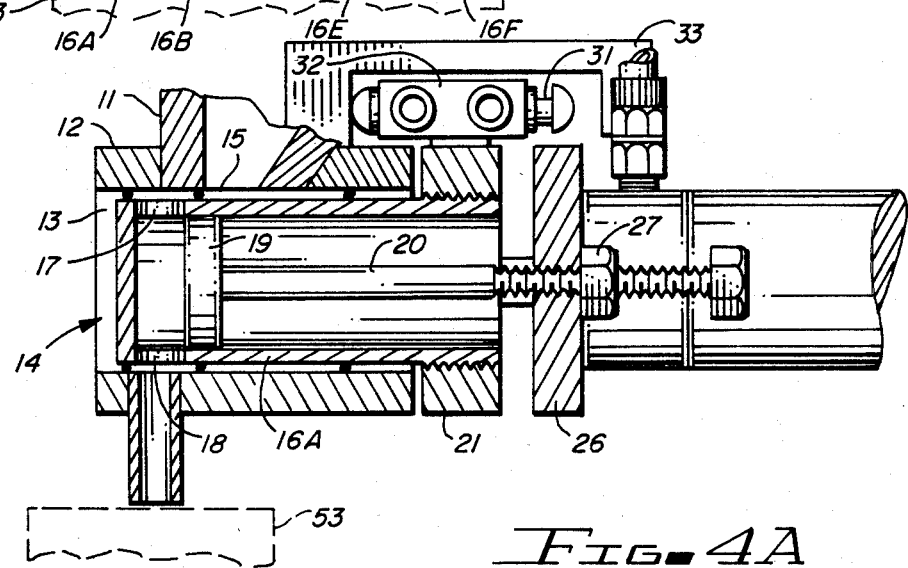
FIGS. 4A–4C are partial cross-sectional views of the syrup measuring and dispensing valves in various positions of operation.

The dispensing valve mechanism 14 comprises a plurality of controlled movable cylinders 16 each having an inlet port 17, an outlet port 18 and a piston 19 having a piston rod 20 movable mounted thereon. A plurality of O-rings are selectively positioned around the periphery of each cylinder 16, as shown in FIG. 4A, to control the sugar syrup dispensed from hopper 11 as hereinafter explained.

Figure 2:
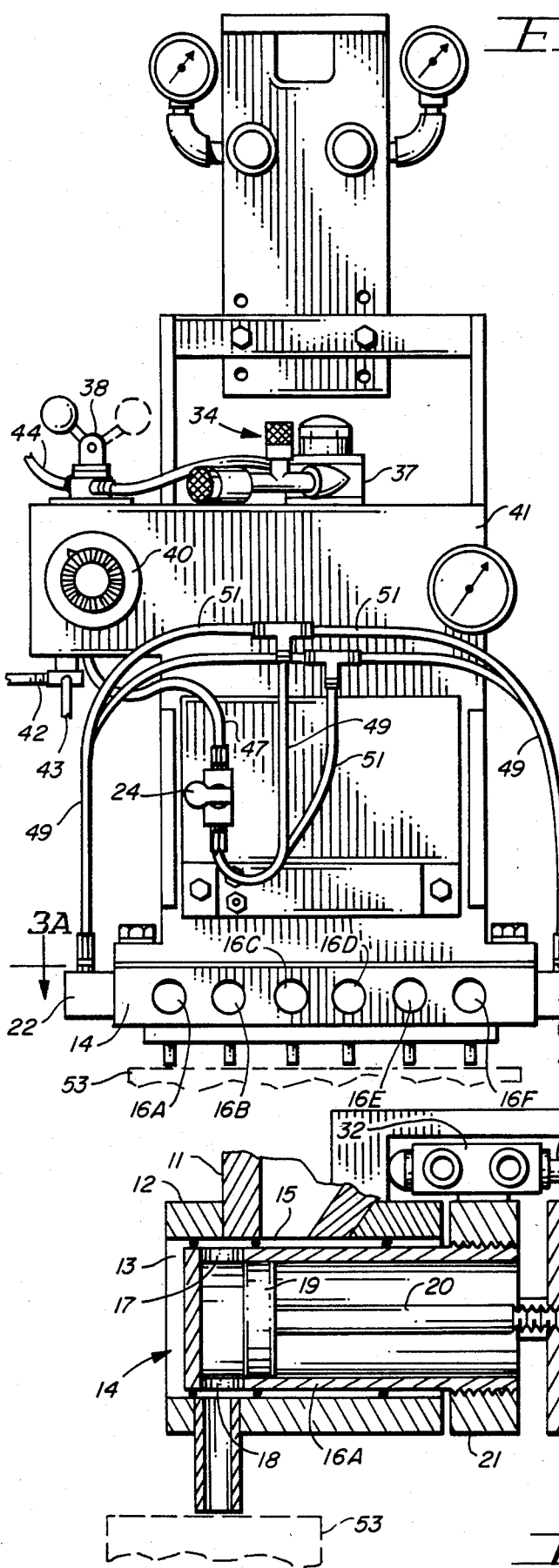
FIG. 2 is a back view of FIG. 1.

Each of the cylinders 16A–16F, shown in FIG. 2, are threadedly attached at a common end to a mounting bar 21 which is actuated by a pair of pneumatic cylinders 22 one mounted at each end of mounting block 12. The pneumatic cylinders are activated by fluid such as air, under pressure supplied sequentially to each end thereof by air pressure lines from a suitable source of air under pressure 23. The unpressurized ends of the pneumatic cylinders are sequentially exhausted through a suitable air line through a sequencing switch 24. The mounting bar 21 is threadedly connected to the piston rods 25 of the pneumatic cylinders 22 and fixedly attached to one common end of each of the cylinders 16A–16F, as shown in FIGS. 3A and 3B.

A threaded connection of each of the piston rods 20 of the dispensing valves 14 to an adjustment bar 26 permits the stroke of the piston in each of the movable cylinder 16 to be controlled individually of each other as illustrated in FIGS. 3A and 3B and 4A–4C by movement of the adjustment nuts 27 along the threaded end of the piston rods 20.

Figure 3A:
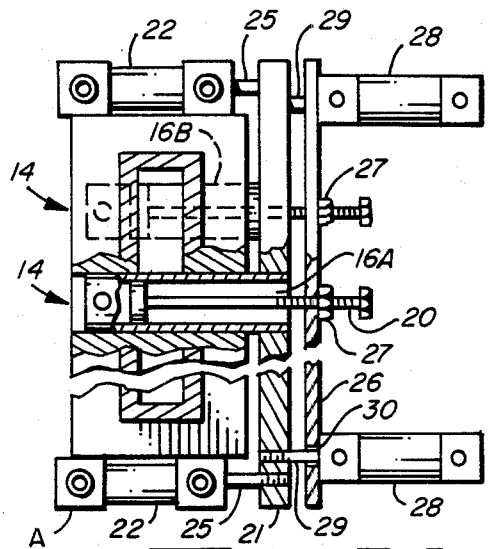
FIG. 3A is a cross-sectional view of FIG. 2 taken along the line 3A—3A with the piston adjustment screws and bar in one position.
Figure 3B:
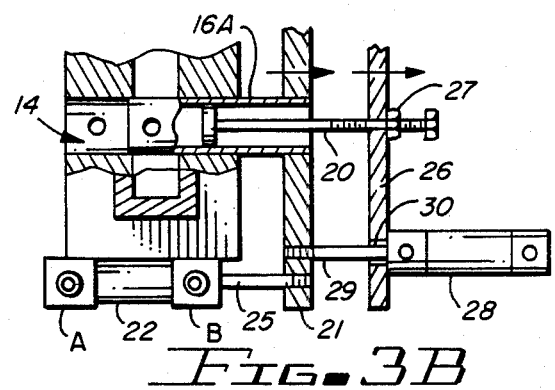
FIG. 3B is a partial view of FIG. 3A with the piston adjustment screws and bar in another position.

A pair of pneumatic cylinders 28 are mounted to extend laterally outwardly of each end of adjustment bar 26 as shown in FIGS. 3A and 3B, with their piston rods 29 extending through apertures 30 in adjustment bar 26 and threadedly attached to mounting bar 21. These pneumatic cylinders are used to reciprocally move piston rods 20 of dispensing valve 14 in inward and outward directions as shown in FIGS. 3A and 3B.

It should be noted that the limits of movement of cylinders 16A–16F in cavities 13 are controlled by a plunger 31 of a pneumatic sequencing switch 32 engaging one or the other legs of a U-shaped stop 33 as shown in FIG. 4A.

FIG. 1 further illustrates the use of a sugar syrup stirring mechanism 34 comprising a paddle 35 mounted on the end of a shaft 36 which is rotatively operated by a pneumatic motor 37 which is connected to the source 23 of air under pressure through a valving mechanism 38.

A pair of strip heaters 39 mounted interiorly or exteriorly of hopper 11 are further utilized to keep the sugar syrup at a chosen temperature. These heaters are connected through a thermostat 40 mounted on a control panel 41 by an electrical circuit not shown which is well known in the art.

SEQUENCE OF OPERATION

The automatic pouring and dispensing machine 10 is activated by source 23 of a suitable fluid under pressure such as air. Air under pressure from source 23 is divided into three trunk lines 42, 43 and 44 and transmitted by lines 42 and 43 to regulators or gages 45 and 46 with air line 47 connecting gage 45 to sequencing valve 24 and air line 48 being connected to sequencing switch 32. Trunk line 44 is connected through valving mechanism 38 to motor 37 of the stirring mechanism 34.

With the machine 10 deactivated at the end of a pouring and dispensing function, the relative parts are positioned as shown in FIG. 4A.

Figure 4B:
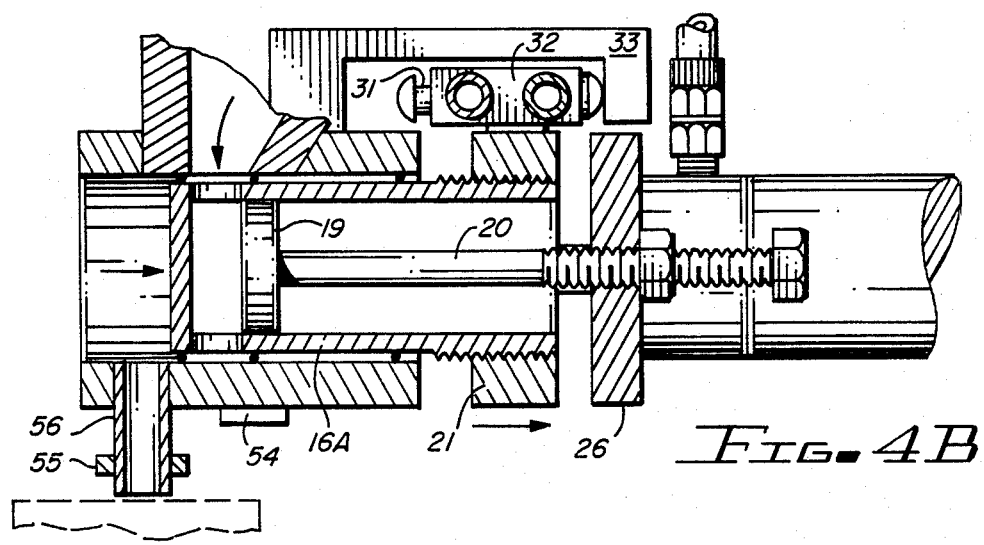

With the sequencing switch or valve 24 in its normal inactive position and upon air pressure being applied thereto by air line 47, as shown in FIG. 4B, air under pressure will be transmitted through air lines 49 to ends A of each of pneumatic cylinders 22. Air under pressure from source 23 through air line 48 also causes sequencing switch 32 to be positioned in its open position as shown in FIG. 4A which in turn transmits air under pressure through air lines 50 to ends A of air cylinders 28.

Figure 4C:
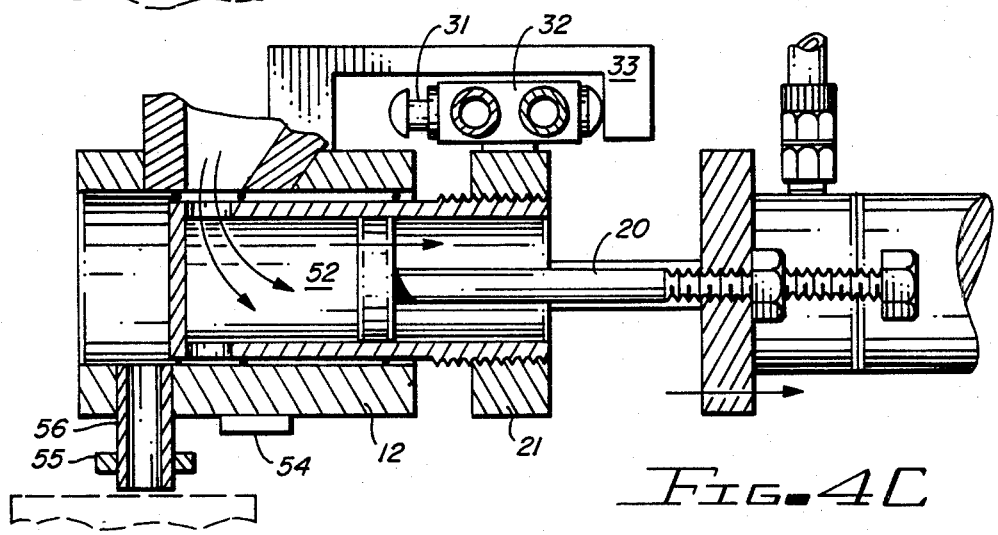

After movement of the piston rod 25 of pneumatic cylinders 22 to the right causing sequencing switch 32 to be moved to its position shown in FIG. 4B, the air under pressure from sequencing switch 32 is transmitted through air lines 50 to end A of pneumatic cylinders 28 causing the piston 19 to be moved fully to the right as shown in FIG. 4C.

The cavity 52 in cylinders 16A-16F are then filled to capacity.

Upon the activation of sequencing valve 24 when the pouring and dispensing machine 10 is suitably positioned over a mold 53, air under pressure is supplied to end B of pneumatic cylinders 22 through air lines 49A which causes cylinders 16A-16F to move to the left as shown in FIG. 4B and this action causes sequencing switch 32 to assume its position shown in FIG. 4B which causes air pressure to be applied to air lines 51 to end B of pneumatic cylinders 28. This action by pneumatic cylinders 28 actuates piston rod 20 of each of the dispensing valves to the left as shown in FIG. 4A to force the sugar syrup in cylinders 16A-16F through outlet ports 18 into the cavities of mold 53.

The above action is repeated each time a mold is filled.

Figure 5:
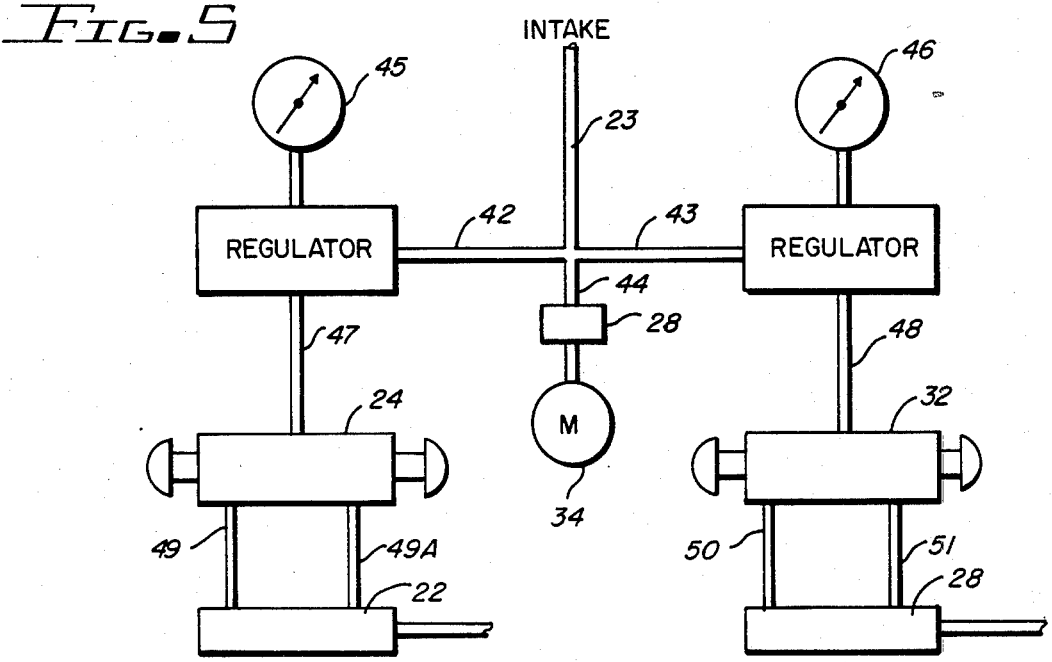
FIG. 5 is a schematic diagram of the pneumatic system disclosed in FIG. 1.

FIG. 5 is a block diagram illustrating the pneumatic system described above.

It should be noted that if suckers are being manufactured, sticks are placed in each mold after filling and before the sugar syrup crystallizes to complete the sucker manufacture. If desired, the sticks may be omitted to form solid pieces of candy.

In order to further modify the machine, heating elements 54, 55 may be added if so desired to the base of mounting block 12 and the outlet nozzle 56 as shown in dash lines in FIG. 43, to keep the syrup in a controlled liquid state until dispensed into the molds.

Although but one embodiment of the invention has been shown and described, it will be apparent to those skilled in the art that various changes and modifications may be made therein without departing from the spirit of the invention or from the scope of the appended claims.

What is claimed is:

1. An apparatus for measuring and dispensing sugar syrups into a mold comprising:

a mounting block defining a cavity therein having first input and output ports, a hopper for dispensing syrups through said first input port into said cavity, a dispensing valve mounted in said cavity, said valve comprising a cylinder movable in said cavity and a piston means movable in said cylinder, said cylinder having second input and output ports, first and second fluid operable means, first and second sequencing means, said first sequencing means, when activated by fluid under pressure in one position, activates said first cylinder means to connect said inlet port of said block with said inlet port of said cylinder and activates said second sequencing means to move said piston means outwardly of said cylinder to enlarge a cavity in said cylinder to receive syrup from said hopper, said first sequencing means, when activated to another position, activating said first cylinder means to move said cylinder to close said first inlet port in said block and said second inlet port in said cylinder and to open said second outlet port in said cylinders and place it in alignment with said first outlet port in said block, said first sequencing means, when activated to said another position, activating said second sequencing means to cause said piston means to move inwardly of said cylinder to force syrup in the cavity in said cylinder out of said first and second outlet ports into a mold.

2. An apparatus for measuring and dispensing sugar syrups into a mold comprising:

a mounting block, said mounting block defining at least one cylindrically shaped cavity therein, a pair of first inlet and outlet ports in said block for communicating with said cavity, a hopper mounted on said block for dispensing syrup into said first inlet port, a syrup dispensing valve mounted in said cavity, said valve comprising a cylinder movably mounted in said cavity for opening and closing said first inlet and outlet ports, said cylinder being provided with a second pair of inlet and outlet ports, piston means reciprocally mounted in said cylinder, a mounting bar attached to one end of said cylinder, an adjustment bar for controlling the position of said piston means in said cylinder, a first pneumatic cylinder means connected to said mounting bar for reciprocally actuating said cylinder in said cavity to sequentially open and close said first pair of inlet and outlet ports, a first sequencing means connected to control the flow of air under pressure to one end or the other end of said first pneumatic cylinder means to cause said reciprocal action, a second pneumatic cylinder means connected to said mounting bar for also moving said cylinder in said cavity, a second sequencing means for controlling the flow of air under pressure to said second pneumatic means, said second sequencing means being actuated by the reciprocal movement of said mounting bar, said first sequencing means, when activated by fluid under pressure to one position, activates said first cylinder means to move said mounting bar to connect said inlet port of said block with said inlet port of said cylinder and activates said second sequencing means to move said piston means outwardly of said cylinder to enlarge a cavity in said cylinder to receive syrup from said hopper, said first sequencing means, when activated to another position, activating said first cylinder means to move said mounting bar to cause said cylinder to close said first inlet port in said block and said second inlet port in said cylinder and to open said second outlet port in said cylinder and place it in alignment with said first outlet port in said block, said first sequencing means, when activated to said another position, activating said second sequencing means to cause said piston means to move inwardly of said cylinder to force syrup in the cavity in said cylinder out of said first and second outlet ports into a mold.

3. The apparatus set forth in claim 2 in further combination with:
a stirring mechanism mounted in said hopper for movement of the syrup.

4. The apparatus set forth in claim 3 wherein:
said stirring mechanism is actuated independently of the activation of said first cylinder means.

5. An apparatus for measuring and dispensing sugar syrups into a mold comprising:
a mounting block,
said mounting block defining a plurality of cylindrically shaped cavities formed therein,
a plurality of pairs of first inlet and outlet ports in said block, one pair being arranged for communicating with each of said cavities,
a hopper mounted on said block for dispensing syrup into each of said inlet ports,
a plurality of syrup dispensing valves, one mounted in each of said cavities,
said valves each comprising a cylinder, one movably mounted in each of said cavities for opening and closing the associated said first inlet and outlet ports,
each of said cylinders being provided with a second pair of inlet and outlet ports,
a plurality of piston means reciprocally mounted, one in each of said cylinders,
a mounting bar attached to a common end of each of said cylinders,
an adjustment bar for controlling the position of each of said piston means in its associated cylinder,
a first pneumatic cylinder means connected to said mounting bar for reciprocally actuating said cylinders in said cavities to sequentially open and close each of said first pairs of inlet and outlet ports,
a first sequencing means connected to control the flow of air under pressure to one end or the other of each of said first pneumatic cylinder means to cause said reciprocal action,
a second pneumatic cylinder means connected to said mounting bar for also moving said cylinders in said cavities, and
a second sequencing means for controlling the flow of air under pressure to said second cylinder means,
said second sequencing means being actuated by the reciprocal movement of said mounting bar,
said first sequencing means when activated by fluid under pressure in one position activates said first cylinder means to move said mounting bar to connect said inlet ports of said block with said inlet ports of said cylinders and activates said second sequencing means to move said piston means outwardly of said cylinders to enlarge cavities in each of said cylinders to receive syrup from said hopper,
said first sequencing means when activated to another position activating said first cylinder means to move said mounting bar to cause said cylinders to close said first inlet ports in said block and said second inlet ports in said cylinders and to open said second outlet ports in said cylinders and place them in alignment with said first outlet port in said block,
said first sequencing means when activated to said another position activating said second sequencing means to cause said piston means to move inwardly of said cylinders to force syrup in said cylinders out of said first and second outlet ports into a mold.

6. The apparatus set forth in claim 5 wherein:
said cavities are parallelly and spacedly arranged in said block.

7. The apparatus set forth in claim 5 in further combination with:
a stirring mechanism mounted in said hopper for movement of the syrup.

8. The apparatus set forth in claim 7 wherein:
said stirring mechanism is actuated independently of the activation of said first cylinder means.

9. The apparatus set forth in claim 8 in further combination with:
heater elements mounted on said hopper for maintaining the temperature of the syrup at a given temperature.

10. The apparatus set forth in claim 8 in further combination with:
a heater element mounted on said block for maintaining the temperature of the syrup in said cylinders at a given temperature.

11. The apparatus set forth in claim 8 in further combination with:
a heater element mounted on the outlet port of said block for heating the syrup passing therethrough.

* * * * *